US012005878B2

(12) United States Patent
Pietila et al.

(10) Patent No.: US 12,005,878 B2
(45) Date of Patent: Jun. 11, 2024

(54) METHODS AND SYSTEMS FOR AUTOMATED BRAKE FEEL OPTIMIZATION FOR TRAILERING

(71) Applicant: GM GLOBAL TECHNOLOGY OPERATIONS LLC, Detroit, MI (US)

(72) Inventors: Glenn Pietila, Howell, MI (US); Steven Aiuto, Commerce Township, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 338 days.

(21) Appl. No.: 17/647,824

(22) Filed: Jan. 12, 2022

(65) Prior Publication Data

US 2023/0219545 A1 Jul. 13, 2023

(51) Int. Cl.
*B60T 8/32* (2006.01)
*B60T 8/172* (2006.01)

(52) U.S. Cl.
CPC .......... *B60T 8/3255* (2013.01); *B60T 8/172* (2013.01); *B60T 2220/04* (2013.01); *B60T 2270/88* (2013.01)

(58) Field of Classification Search
CPC .... B60T 8/3255; B60T 8/172; B60T 2220/04; B60T 2270/88
See application file for complete search history.

(56) References Cited

U.S. PATENT DOCUMENTS

| | | | | |
|---|---|---|---|---|
| 3,909,075 A * | 9/1975 | Pittet, Jr. | ................. | B60T 8/323 |
| | | | | 188/3 R |
| 4,787,683 A * | 11/1988 | Singleton | .............. | B60T 8/1708 |
| | | | | 303/127 |
| 6,012,780 A * | 1/2000 | Duvernay | ................. | B60T 7/20 |
| | | | | 303/7 |
| 6,273,522 B1 * | 8/2001 | Feetenby | ................. | B60T 8/00 |
| | | | | 303/9.69 |
| 7,672,770 B2 * | 3/2010 | Inoue | ...................... | B60L 50/16 |
| | | | | 701/87 |
| 9,446,747 B2 * | 9/2016 | Fosdike | ................ | B60T 8/1708 |

* cited by examiner

*Primary Examiner* — Gertrude Arthur Jeanglaude
(74) *Attorney, Agent, or Firm* — Lorenz & Kopf, LLP (57) ABSTRACT

Methods and systems are provided for a vehicle towing a trailer. In an embodiments, a method includes: storing, in a data storage device, target deceleration values associated with the vehicle not towing the trailer; when the vehicle towing the trailer is determined to be braking, determining, by a processor, that a target deceleration value of the target deceleration values is not met, adjusting a brake sensitivity value associated with trailer braking based on the target deceleration value; and controlling deceleration of the towing vehicle based on the brake sensitivity value.

20 Claims, 4 Drawing Sheets

METHODS AND SYSTEMS FOR AUTOMATED BRAKE FEEL OPTIMIZATION FOR TRAILERING

INTRODUCTION

The technical field generally relates to vehicles and, more specifically, to methods and systems for controlling vehicles with trailers to optimize brake feeling while towing.

Various vehicles may serve as tow vehicles for towing a trailer. Some vehicle and trailer systems allow a driver to command application of brakes of the trailer using a mechanical interface provided in the vehicle. For example, the brakes of all wheels of the trailer can be applied at the same time and at the same magnitude. Vehicle and trailer brakes can be used in conjunction to ensure a smooth braking operation of the combined system. In some instances, the feeling of smooth brake operation perceived by the driver is subjective.

Accordingly, it is desirable to provide methods and systems for controlling brakes of a trailer to improve the subjective qualities of a trailer braking maneuver. Furthermore, other desirable features and characteristics of the present invention will become apparent from the subsequent detailed description of the invention and the appended claims, taken in conjunction with the accompanying drawings and this background of the invention.

SUMMARY

In accordance with an exemplary embodiments, methods and systems are provided for controlling deceleration of a vehicle towing a trailer. In one embodiment, a method includes: storing, in a data storage device, target deceleration values associated with the vehicle not towing the trailer; when the vehicle towing the trailer is determined to be braking, determining, by a processor, that a target deceleration value of the target deceleration values is not met, adjusting a brake sensitivity value associated with trailer braking based on the target deceleration value; and controlling deceleration of the towing vehicle based on the brake sensitivity value.

In various embodiments, the target deceleration values include a curve defined by deceleration rate and at least one of brake pedal position and brake pressure.

In various embodiments, the storing is performed based on sensed values and in realtime with the vehicle not towing the trailer.

In various embodiments, the storing is based on predefined values.

In various embodiments, the method further includes determining when a brake pressure is above a brake pressure threshold, and in response, the adjusting comprises setting the brake sensitivity value to brake gain threshold.

In various embodiments, the method further includes determining when a brake pressure is below a brake pressure threshold, and in response the adjusting comprises scaling a brake sensitivity curve based on a difference between the target deceleration value and an actual deceleration value.

In various embodiments, the limiting the brake sensitivity curve is based on a brake gain threshold.

In various embodiments, the method further includes applying a filter to the scaled brake sensitivity curve controlling brakes of the trailer by generating control signals based on the brake sensitivity value.

In another embodiment, a system includes: a computer readable medium configured to store target deceleration values associated with the vehicle not towing the trailer; and a processor onboard the vehicle and configured to: when the vehicle towing the trailer is determined to be braking, determine that a target deceleration value of the target deceleration values is not met, adjust a brake sensitivity value associated with trailer braking based on the target deceleration value; and control deceleration of the towing vehicle based on the brake sensitivity value. the target deceleration values include a curve defined by deceleration rate and at least one of brake pedal position and brake pressure.

In various embodiments, the computer readable medium stores the target deceleration values based on sensed values and in realtime with the vehicle not towing the trailer.

In various embodiments, the computer readable medium stores the target deceleration values based on predefined values.

In various embodiments, the computer readable medium is further configured to determine when a brake pressure is above a brake pressure threshold, and in response, adjust by setting the brake sensitivity value to a brake gain threshold.

In various embodiments, the computer readable medium is further configured to determine when a brake pressure is below a brake pressure threshold, and in response, adjust by scaling a brake sensitivity curve based on a difference between the target deceleration value and an actual deceleration value.

In various embodiments, the computer readable medium is further configured to limit the brake gain sensitivity curve based on a break gain threshold.

In various embodiments, the computer readable medium is further configured to apply a filter to the scaled brake sensitivity curve.

In various embodiments, the computer readable medium is further configured to control brakes of the trailer by generating control signals based on the brake sensitivity value.

In another embodiment, a vehicle includes: a connection apparatus configured to connect to a trailer; and a computer readable medium configured to store target deceleration values associated with the vehicle not towing the trailer; and a processor onboard the vehicle and configured to: when the vehicle towing the trailer is determined to be braking, determining, by a processor, that a target deceleration value of the target deceleration values is not met, adjusting a brake sensitivity value associated with trailer braking based on the target deceleration value; and controlling deceleration of the towing vehicle based on the brake sensitivity value.

In various embodiments, the computer readable medium is further configured to: determine when a brake pressure is above a brake pressure threshold, and in response, adjust by setting the brake sensitivity value to a brake gain threshold; and determine when the brake pressure is below the brake pressure threshold, and in response, adjust by scaling a brake sensitivity curve based on a difference between the target deceleration value and an actual deceleration value.

DESCRIPTION OF THE DRAWINGS

The present disclosure will hereinafter be described in conjunction with the following drawing figures, wherein like numerals denote like elements, and wherein.

DETAILED DESCRIPTION

The following detailed description is merely exemplary in nature and is not intended to limit the application and uses. Furthermore, there is no intention to be bound by any expressed or implied theory presented in the preceding technical field, background, brief summary or the following detailed description. As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems, and that the systems described herein is merely exemplary embodiments of the present disclosure.

For the sake of brevity, conventional techniques related to signal processing, data transmission, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

Figure 1:
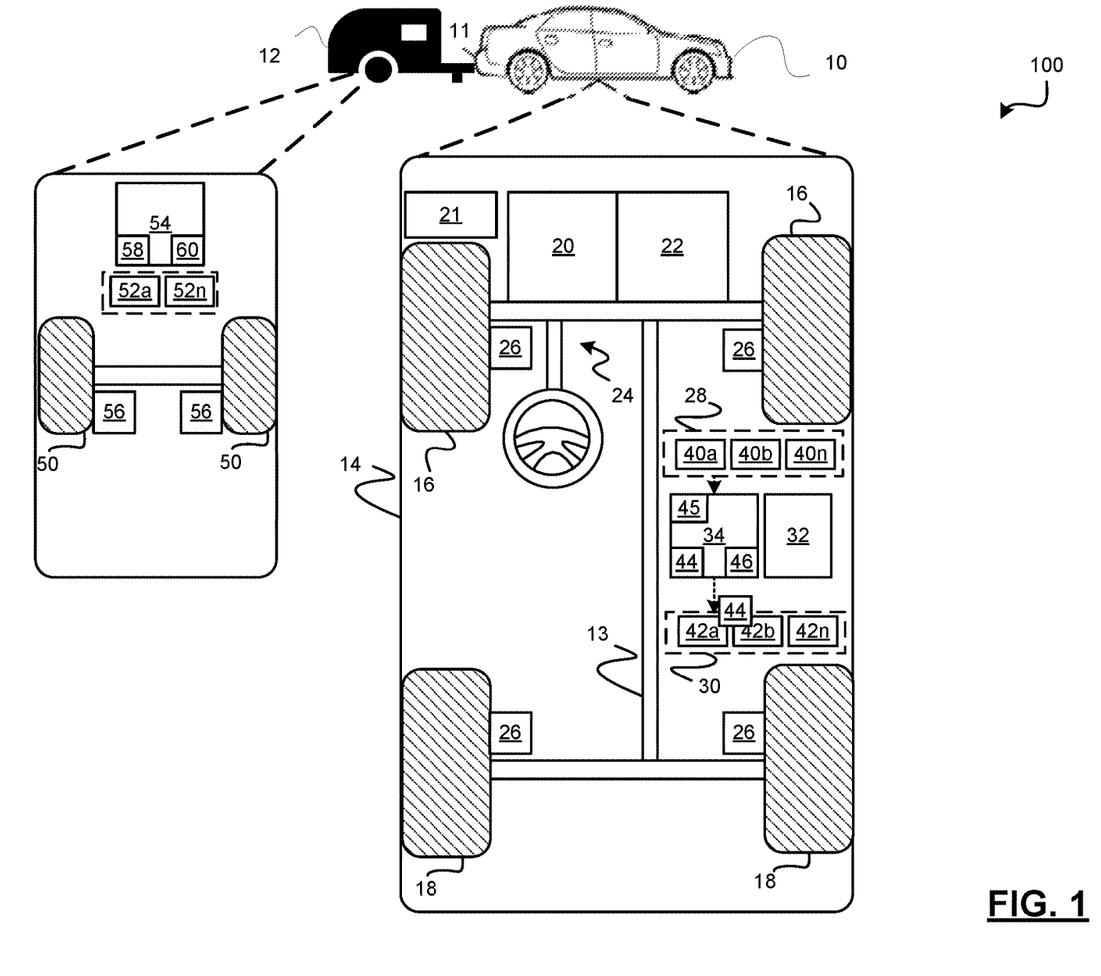
FIG. 1 is a functional block diagram of a vehicle that includes a braking system for controlling brakes of a trailer that is towed by the vehicle, in accordance with various embodiments.

With reference to FIG. 1, a braking system shown generally at 100 is associated with a vehicle 10 and a trailer 12 in accordance with various embodiments. The vehicle 10 is configured to couple to and connect to the trailer 12 via a connection apparatus 11 and is configured to tow the trailer 12. In various embodiments, the connection apparatus 11 comprises a hitch. In various other embodiments, the connection apparatus 11 comprises one or more other types of systems, such as a gooseneck for a fifth wheel trailer, and so on. In various embodiments, the connection apparatus 11 further comprises a wiring harness configured to communicate power and/or communication signals to components of the trailer 12.

As described in greater detail further below, the braking system 100 includes a computer system configured to monitor the occurrence of braking, deceleration, brake pedal position, and brake pressure during vehicle brake events when the trailer is not connected to the vehicle. The computer system use these signals to compare the actual traileing vehicle deceleration to a targeted vehicle deceleration stored in memory. The computer system uses the comparison in a learning algorithm to adjust a sensitivity curve to align the actual trailering vehicle deceleration with the targeted deceleration. The computer system then selectively uses the sensitivity curve such that an optimum stopping distance is maintained for the trailering vehicle in aggressive deceleration events while improving brake feel by an operator in non-aggressive braking events.

In various embodiments, the vehicle 10 comprises an automobile. The vehicle 10 may be any one of a number of different types of automobiles, such as, for example, a sedan, a wagon, a truck, or a sport utility vehicle (SUV), and may be two-wheel drive (2WD) (i.e., rear-wheel drive or front-wheel drive), four-wheel drive (4WD) or all-wheel drive (AWD), and/or various other types of vehicles in certain embodiments. In various embodiments, the vehicle 10 may also comprise other types of mobile platforms capable of towing and is not limited to an automobile.

As depicted in FIG. 1, the exemplary vehicle 10 generally includes a chassis 13, a body 14, front wheels 16, and rear wheels 18. The body 14 is arranged on the chassis 13 and substantially encloses components of the vehicle 10. The body 14 and the chassis 13 may jointly form a frame. The wheels 16-18 are each rotationally coupled to the chassis 13 near a respective corner of the body 14.

The vehicle 10 generally includes a propulsion system 20, a transmission system 22, a steering system 24, a brake system 26, a sensor system 28, an actuator system 30, at least one data storage device 32, and at least one controller 34. The propulsion system 20 may, in various embodiments, include an internal combustion engine, an electric machine such as a traction motor, and/or a fuel cell propulsion system. The transmission system 22 is configured to transmit power from the propulsion system 20 to the vehicle wheels 16-18 according to selectable speed ratios. According to various embodiments, the transmission system 22 may include a step-ratio automatic transmission, a continuously-variable transmission, or other appropriate transmission. The brake system 26 is configured to provide braking torque to the vehicle wheels 16-18. The brake system 26 may, in various embodiments, include friction brakes, brake by wire, a regenerative braking system such as an electric machine, and/or other appropriate braking systems. The steering system 24 influences a position of the of the vehicle wheels 16-18. While depicted as including a steering wheel for illustrative purposes, in some embodiments contemplated within the scope of the present disclosure, the steering system 24 may not include a steering wheel.

The sensor system 28 includes one or more sensing devices 40*a*-40*n* that sense observable conditions of the exterior and/or interior environment of the vehicle and/or of the vehicle itself. The sensing devices 40*a*-40*n* can include, but are not limited to, radars, lidars, global positioning systems, optical cameras, thermal cameras, ultrasonic sensors, inertial measurement units, pressure sensors, position sensors, speed sensors, and/or other sensors.

The actuator system 30 includes one or more actuator devices 42*a*-42*n* that control one or more vehicle features such as, but not limited to, the propulsion system 20, the transmission system 22, the steering system 24, and the brake system 26. In various embodiments, the vehicle features can further include interior and/or exterior vehicle features such as, but are not limited to, doors, a trunk, and cabin features such as air, music, lighting, etc. (not numbered).

The data storage device 32 stores data for use in controlling the vehicle 10. In various embodiments, the data storage device 32 stores defined values for controlling the vehicle. As can be appreciated, the data storage device 32 may be part of the controller 34, separate from the controller 34, or part of the controller 34 and part of a separate system.

The controller 34 includes at least one processor 44, a communication bus 45, a computer readable storage device or media 46. The processor 44 can be any custom made or commercially available processor, a central processing unit (CPU), a graphics processing unit (GPU), an auxiliary processor among several processors associated with the controller 34, a semiconductor based microprocessor (in the form of a microchip or chip set), a macroprocessor, any combination thereof, or generally any device for executing instructions. The computer readable storage device or media 46 may include volatile and nonvolatile storage in read-only memory (ROM), random-access memory (RAM), and keep-alive memory (KAM), for example. KAM is a persistent or non-volatile memory that may be used to store various operating variables while the processor 44 is powered down. The computer-readable storage device or media 46 may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 34 in controlling the vehicle 10. The bus 45 serves to transmit programs, data, status and other information or signals between the various components of the vehicle and/or trailer. The bus 45 can be any suitable physical or logical means of connecting computer systems and components. This includes, but is not limited to, direct hard-wired connections, fiber optics, infrared and wireless bus technologies.

The instructions may include one or more separate programs, each of which comprises an ordered listing of executable instructions for implementing logical functions. The instructions, when executed by the processor 44, receive and process signals from the sensor system 28, perform logic, calculations, methods and/or algorithms for automatically controlling the components of the vehicle 10, and generate control signals to the actuator system 30 to automatically control the components of the vehicle 10 based on the logic, calculations, methods, and/or algorithms. Although only one controller 34 is shown in FIG. 1, embodiments of the vehicle 10 can include any number of controllers 34 that communicate over any suitable communication medium or a combination of communication mediums and that cooperate to process the sensor signals, perform logic, calculations, methods, and/or algorithms, and generate control signals to automatically control features of the vehicle 10.

In various embodiments, one or more instructions of the controller 34 are embodied in the braking system 100 and, when executed by the processor 44, learn a sensitivity curve based on target values learned while the vehicle 10 is not towing the trailer 12. The instructions further, when executed by the processor 44, control the deceleration of the trailer 12 and thus, of the vehicle 10 based on the learned deceleration curve.

It will be appreciated that the controller 34 may otherwise differ from the embodiment depicted in FIG. 1. For example, the controller 34 may be coupled to or may otherwise utilize one or more remote computer systems and/or other control systems, for example as part of one or more of the above-identified vehicle devices and systems. It will be appreciated that while this exemplary embodiment is described in the context of a fully functioning computer system, those skilled in the art will recognize that the mechanisms of the present disclosure are capable of being distributed as a program product with one or more types of non-transitory computer-readable signal bearing media used to store the program and the instructions thereof and carry out the distribution thereof, such as a non-transitory computer readable medium bearing the program and containing computer instructions stored therein for causing a computer processor (such as the processor 44) to perform and execute the program. Such a program product may take a variety of forms, and the present disclosure applies equally regardless of the particular type of computer-readable signal bearing media used to carry out the distribution. Examples of signal bearing media include recordable media such as floppy disks, hard drives, memory cards and optical disks, and transmission media such as digital and analog communication links. It will be appreciated that cloud-based storage and/or other techniques may also be utilized in certain embodiments. It will similarly be appreciated that the computer system of the controller 34 may also otherwise differ from the embodiment depicted in FIG. 1, for example in that the computer system of the controller 34 may be coupled to or may otherwise utilize one or more remote computer systems and/or other control systems.

As depicted in FIG. 1, in various embodiments, the trailer 12 also includes a plurality of wheels 50, as well as one or more sensors 52a-52n, a controller 54, and/or a braking system 56 associated with the wheels 50. In various embodiments, the sensors 52a-52n of the trailer 12 provide sensor data pertaining to the trailer 12. Also in various embodiments, the controller 54 of the trailer 12 may include a processor 58 and computer readable storage device or media 60 that provide certain functions described in connection with the controller 34 of the vehicle 10. In addition, in various embodiments, the braking system 56 may provide braking for the trailer 12, for example in accordance with instructions provided by the controller 34 of the vehicle 10 (and/or, in certain embodiments, via the controller 54 of the trailer 12).

Figure 2:
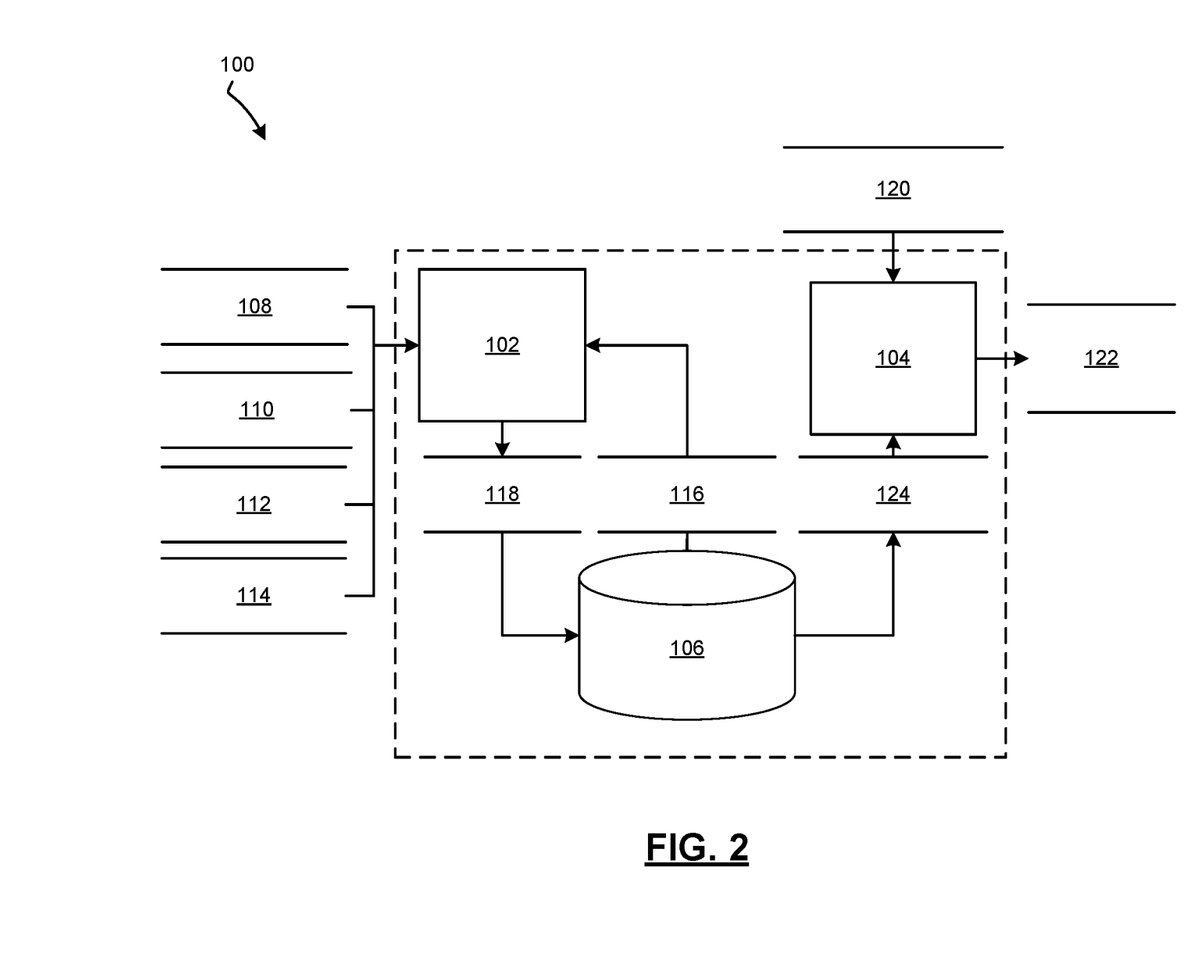
FIG. 2 is a dataflow diagram illustrating the braking system of the vehicle of FIG. 1, in accordance with various embodiments.

With reference to FIG. 2 and with continued reference to FIG. 1, a dataflow diagram illustrates elements of the braking system 100 of FIG. 1 in accordance with various embodiments. As can be appreciated, various embodiments of the braking system 100 according to the present disclosure may include any number of modules embedded within the controller 34 which may be combined and/or further partitioned to similarly implement systems and methods described herein. Furthermore, inputs to the braking system 100 may be received from the sensor system 28, received from other control modules (not shown) associated with the vehicle 10, and/or determined/modeled by other sub-modules (not shown) within the controller 34 of FIG. 1. Furthermore, the inputs might also be subjected to preprocessing, such as sub-sampling, noise-reduction, normalization, feature-extraction, missing data reduction, and the like. In various embodiments, the braking system 100 includes a deceleration monitoring module 102, a deceleration control module 104, and a target data datastore 106.

The target data datastore 106 stores data that defines target values for deceleration. In various embodiments, the target values include a deceleration rate verses brake pedal position curve, a brake pressure threshold, and a brake gain threshold. In various embodiments, the deceleration rate verses brake pedal position curve can be predefined or learned over time as the driver operates the vehicle 10 while the vehicle 10 is not towing a trailer 12. In various embodiments, the brake pressure threshold, and/or the brake gain threshold can be predefined and/or learned when the trailer 12 is first connected to the vehicle 10. In various embodiments, any of the target values can be constant values or can be defined based on various speeds.

In various embodiments, the target values further include a brake signal verses pedal position curve, and a brake signal sensitivity curve. In various embodiments, any of the target values can be constant values or can be defined based on various speeds. In various embodiments, one or more of these values are learned over time and are used to control the braking system 56 of the trailer 12 and/or the vehicle 10 while the vehicle 10 is trailering as described herein below.

As can be appreciated, in various embodiments the brake pedal position values and the brake pressure values disclosed herein may be used interchangeably based on their relationship, as embodiments are not limited to the examples disclosed herein.

In various embodiments, the deceleration monitoring module 102 receives as input data from, for example, the CAN bus 45 such as, but not limited to, vehicle deceleration data 108, brake pedal position data 110, brake pressure data 112, and trailer brake boost gain data 114. The deceleration monitoring module 102 monitors the received data when a brake event is determined to be active (e.g., when the brake pedal position is greater than a threshold, or some other indicator of a braking event).

When the brake event is determined to be active, the deceleration monitoring module 102 compares the actual trailering vehicle deceleration as indicated by the vehicle deceleration data 108 to targeted vehicle deceleration data 116 obtained from the target data datastore 106 (and previously stored while the vehicle 10 was not towing a trailer 12). The comparison is then used to learn or update the sensitivity curve data 118 stored in the target data datastore 106 to align the actual trailering vehicle deceleration with the targeted vehicle deceleration. The deceleration monitoring module 102 stores the updated sensitivity curve data 118 in the target data datastore 106.

Figure 3:
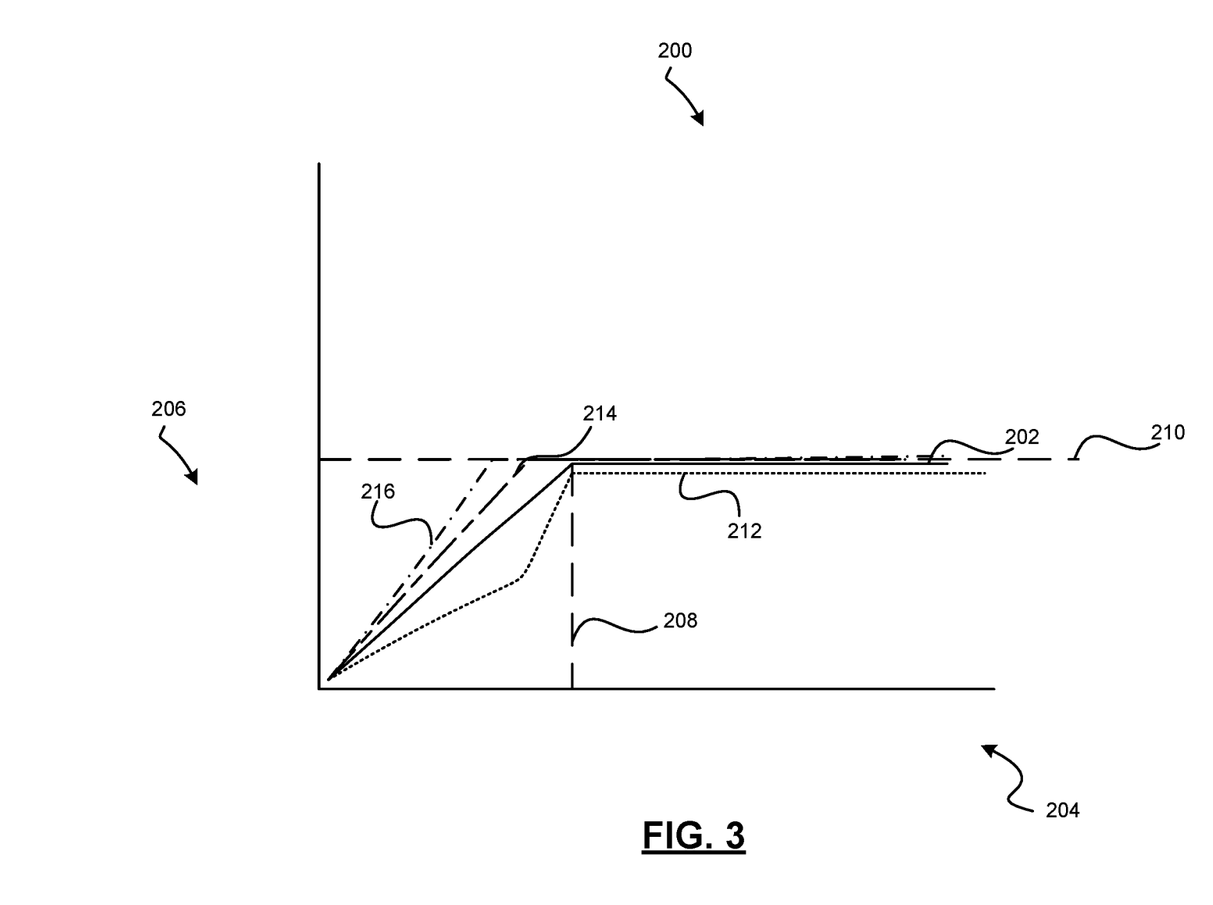
FIG. 3 is a graph illustrating data points used by the braking system for trailer braking, in accordance with various embodiments.

For example, as shown in the graph 200 of FIG. 3, a first sensitivity curve 202 is stored. The sensitivity curve 202 is defined by brake pressure 204 represented along the x-axis and voltage 206 represented along the y-axis. In various embodiments, the voltage 206 represents the output signal value (or some relationship to) communicated to the trailer braking system 56. The sensitivity curve 202 is further defined by a brake pressure threshold 208 and a brake gain threshold 210. The sensitivity values before the brake pressure threshold 208 may be linearly defined or based on spline curves. The sensitivity values after the brake pressure threshold 208 are defined to target a highest value without producing tire skid.

The sensitivity curve 202 can be adjusted to other sensitivity curves by adjusting the sensitivity values based on the target deceleration values that are stored when the vehicle 10 is not trailering. For example, sensitivity curve 212 provides lower sensitivity values which presents as less "grabby" brakes to a driver. In another example, sensitivity 214 and sensitivity 216 provides increased sensitivity values which may present as "grabby" brakes to a driver.

By adjusting the sensitivity values before the brake pressure threshold 208 and limiting the sensitivity values to the brake gain threshold after the brake pressure threshold 208, an optimum stopping distance for the trailering vehicle 10 is maintained in aggressive deceleration events, while brake feel in non-aggressive braking events is improved to provide a more familiar consistent brake feel such as reducing the number and severity of unexpected brake feel events such as non-linear deceleration, brake grab, over or under sensitive brake feel, etc. The sensitivity values before the brake pressure threshold 208 can be adjusted by scaling the sensitivity values based on a difference between the actual deceleration and the target deceleration. The adjusted sensitivity values are limited, for example, by the brake gain threshold 210, and the changes to the sensitivity values may optionally be filtered before being used.

With reference back to FIG. 2, the deceleration control module 104 receives as input CAN data such as brake pedal position data 120. The deceleration control module 104 controls the braking system 56 of the trailer 12 by generating brake control 126 signals to provide a deceleration feel based on the brake pedal position and the learned curve values 124 stored in the target data datastore 106.

Figure 4:
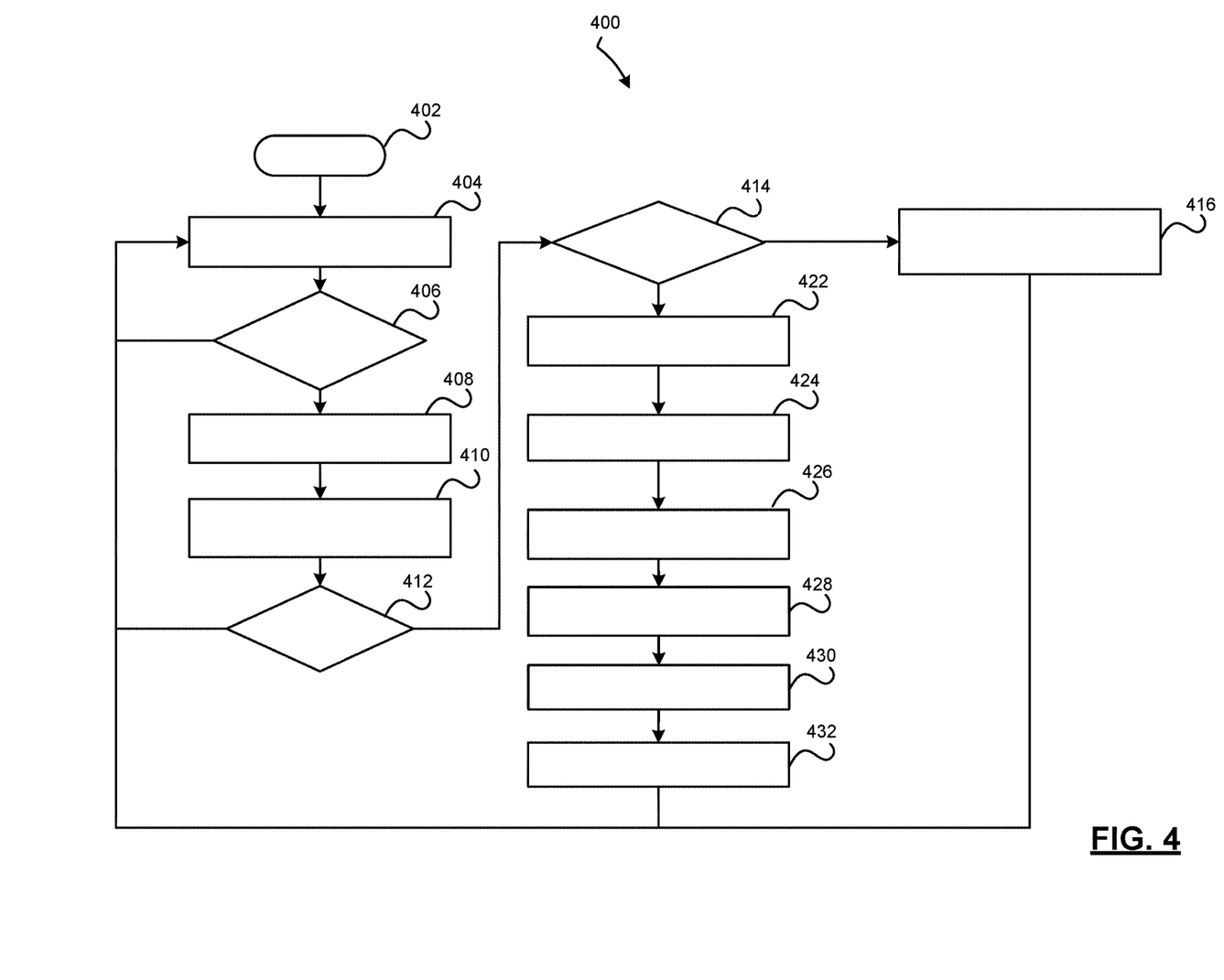
FIG. 4 is a flowchart of a process for learning values for controlling trailer braking, in accordance with exemplary embodiments.

With reference to FIG. 4 and with continued reference to FIGS. 1-3, a flowchart is provided of a method 400 for controlling braking of the vehicle 12 and/or the vehicle 10 of FIG. 1 as performed by the braking system 100, in accordance with exemplary embodiments. As can be appreciated in light of the disclosure, the order of operation within the method is not limited to the sequential execution as illustrated in FIG. 4, but may be performed in one or more varying orders as applicable and in accordance with the present disclosure. In various embodiments, the method 400 can be scheduled to run based on one or more predetermined events, and/or can run continuously during operation of the vehicle 10

As can be appreciated, various target values are pre-stored while the vehicle 10 is not towing the trailer 12 as discussed above.

In one example, the method 400 may begin at 402. The CAN data is received at 404. It is determined whether a vehicle brake event is active at 406. If a vehicle brake event is not active at 406, the method 400 continues with monitoring the CAN data at 404.

If a vehicle braking event is active at 406, the trailer brake signal is determined at 408, for example, based on the brake gain threshold stored in the target data datastore 106. The target deceleration is determined at 410 for example, based on the brake pedal position and the brake pedal position verses deceleration rate curve stored in the target data datastore 106. Thereafter, it is determined whether the target deceleration is met at 412. If the target deceleration is met at 412, the method 400 continues with monitoring the CAN data at 404. If, however, the target deceleration is not met at 412, it is determined whether the brake pressure is above the brake pressure threshold at 414, and the trailer brake control signal is selectively adjusted at 416-430 based thereon.

For example, if the brake pressure is above the brake pressure threshold at 414, the trailer brake control signal 122 is set to the brake gain threshold 210 without tire skid at 416. Thereafter, the method 400 continues with monitoring the CAN data at 404.

If, however, the brake pressure is below the brake pressure threshold at 414, a difference between the target deceleration and the deceleration at 422 is determined and used to scale the sensitivity curve at 424. The sensitivity curve is limited based on the brake gain threshold 210 at 426 and a filter may optionally be applied at 428. Thereafter, the learned curve is stored in the target curve datastore at 430 and the brake control signals 432 are generated based on the curve values in controlling the deceleration of the trailering vehicle 10 by controlling the braking system 56 of the trailer 12. Thereafter, the method 400 continues with monitoring the CAN data at 404.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A method for controlling deceleration of a vehicle towing a trailer, comprising:
   storing, in a data storage device, target deceleration values associated with the vehicle not towing the trailer;
   when the vehicle towing the trailer is determined to be braking,
      determining, by a processor, that a target deceleration value of the target deceleration values based on a brake pedal position is not met,
      adjusting a brake sensitivity value associated with trailer braking based on the target deceleration value; and
      controlling deceleration of the towing vehicle based on the brake sensitivity value.

2. The method of claim 1, wherein the target deceleration values include a curve defined by deceleration rate and at least one of the brake pedal position and brake pressure.

3. The method of claim 2, wherein the storing is performed based on sensed values and in realtime with the vehicle not towing the trailer.

4. The method of claim 2, where the storing is based on predefined values.

5. The method of claim 1, further comprising:
   determining when a brake pressure is above a brake pressure threshold, and in response, the adjusting comprises setting the brake sensitivity value to brake gain threshold.

6. The method of claim 1, further comprising:
   determining when a brake pressure is below a brake pressure threshold, and in response the adjusting comprises scaling a brake sensitivity curve based on a difference between the target deceleration value and an actual deceleration value.

7. The method of claim 6, further comprising limiting the brake sensitivity curve based on a brake gain threshold.

8. The method of claim 6, further comprising applying a filter to the scaled brake sensitivity curve.

9. The method of claim 1, further comprising controlling brakes of the trailer by generating control signals based on the brake sensitivity value.

10. A system for controlling deceleration of a vehicle towing a trailer, comprising:
    a computer readable medium configured to store target deceleration values associated with the vehicle not towing the trailer; and
    a processor onboard the vehicle and configured to:
       when the vehicle towing the trailer is determined to be braking,
          determine that a target deceleration value of the target deceleration values based on a brake pedal position is not met,
          adjust a brake sensitivity value associated with trailer braking based on the target deceleration value; and
          control deceleration of the towing vehicle based on the brake sensitivity value.

11. The system of claim 10, wherein the target deceleration values include a curve defined by deceleration rate and at least one of the brake pedal position and brake pressure.

12. The system of claim 11, wherein the computer readable medium stores the target deceleration values based on sensed values and in realtime with the vehicle not towing the trailer.

13. The system of claim 11, wherein the computer readable medium stores the target deceleration values based on predefined values.

14. The system of claim 10, wherein the computer readable medium is further configured to determine when a brake pressure is above a brake pressure threshold, and in response, adjust by setting the brake sensitivity value to a brake gain threshold.

15. The system of claim 10, wherein the computer readable medium is further configured to determine when a brake pressure is below a brake pressure threshold, and in response, adjust by scaling a brake sensitivity curve based on a difference between the target deceleration value and an actual deceleration value.

16. The system of claim 15, wherein the computer readable medium is further configured to limit the brake gain sensitivity curve based on a break gain threshold.

17. The system of claim 15, wherein the computer readable medium is further configured to apply a filter to the scaled brake sensitivity curve.

18. The system of claim 10, wherein the computer readable medium is further configured to control brakes of the trailer by generating control signals based on the brake sensitivity value.

19. A vehicle, comprising:
    a connection apparatus configured to connect to a trailer; and
    a computer readable medium configured to store target deceleration values associated with the vehicle not towing the trailer; and
    a processor onboard the vehicle and configured to:
       when the vehicle towing the trailer is determined to be braking,
          determining, by a processor, that a target deceleration value of the target deceleration values based on a brake pedal position is not met,
          adjusting a brake sensitivity value associated with trailer braking based on the target deceleration value; and
          controlling deceleration of the towing vehicle based on the brake sensitivity value.

20. The vehicle of claim 19, wherein the computer readable medium is further configured to:
    determine when a brake pressure is above a brake pressure threshold, and in response, adjust by setting the brake sensitivity value to a brake gain threshold; and determine when the brake pressure is below the brake pressure threshold, and in response, adjust by scaling a brake sensitivity curve based on a difference between the target deceleration value and an actual deceleration value.

* * * * *